(12) United States Patent
Yamashita et al.

(10) Patent No.: US 12,216,263 B2
(45) Date of Patent: Feb. 4, 2025

(54) SCANNING MICROSCOPE UNIT (71) Applicant: HAMAMATSU PHOTONICS K.K., Hamamatsu (JP)

(72) Inventors: Jiro Yamashita, Hamamatsu (JP); Yasuyuki Tanabe, Hamamatsu (JP); Shunsuke Matsuda, Hamamatsu (JP); Hirotoshi Terada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 681 days.

(21) Appl. No.: 17/442,287

(22) PCT Filed: Mar. 26, 2020

(86) PCT No.: PCT/JP2020/013798
§ 371 (c)(1),
(2) Date: Sep. 23, 2021

(87) PCT Pub. No.: WO2020/196782
PCT Pub. Date: Oct. 1, 2020

(65) Prior Publication Data
US 2022/0155576 A1 May 19, 2022

(30) Foreign Application Priority Data

Mar. 28, 2019 (JP) ................................. 2019-062987

(51) Int. Cl.
*G02B 21/00* (2006.01)
(52) U.S. Cl.
CPC ..... *G02B 21/0032* (2013.01); *G02B 21/0048* (2013.01); *G02B 21/0076* (2013.01)
(58) Field of Classification Search
CPC ............ G02B 21/0032; G02B 21/0048; G02B 21/0076; G02B 21/0036; G02B 21/24
See application file for complete search history.

(56) References Cited

U.S. PATENT DOCUMENTS 6,147,798 A 11/2000 Brooker et al.
2004/0178334 A1 9/2004 Sasaki
(Continued)

FOREIGN PATENT DOCUMENTS

CN 102841083 A 12/2012
DE 102018201490 B3 1/2019
(Continued)

OTHER PUBLICATIONS

Machine translation of JPH5088092 retrieved electronically from Espacenet May 15, 2024 (Year: 2024).*

(Continued)

*Primary Examiner* — Cara E Rakowski
(74) *Attorney, Agent, or Firm* — Faegre Drinker Biddle & Reath LLP (57) ABSTRACT

Embodiments are for a confocal microscope unit attached to a connection port of a microscope including: light sources which output irradiation light to a sample to be observed; photodetectors which detect observation light generated from a sample in response to the irradiation light; a scan mirror which scans the irradiation light on the sample and guides the observation light generated from the sample to the photodetectors; a scan lens which guides the irradiation light scanned by the scan mirror to the microscope optical system and guides the observation light focused by the microscope optical system to the scan mirror; a lens barrel to which the scan lens is fixed; an attachment portion which attaches the lens barrel to the connection port ; and a movable portion which supports the lens barrel so that an angle of the lens barrel with respect to the attachment portion is changeable.

9 Claims, 7 Drawing Sheets

(56) References Cited

U.S. PATENT DOCUMENTS

2016/0313545 A1   10/2016  Kondo et al.
2021/0302709 A1*   9/2021  Yoshida ............. G02B 27/0031

FOREIGN PATENT DOCUMENTS

| EP | 2322969 A1 | 5/2011 |
|----|------------|--------|
| JP | H05-088092 A | 4/1993 |
| JP | H7-104163 A | 4/1995 |
| JP | 2002-214533 A | 7/2002 |
| JP | 2003-279858 A | 10/2003 |
| JP | 2005-309412 A | 11/2005 |
| JP | 2006-030296 A | 2/2006 |
| JP | 2009-116082 A | 5/2009 |
| JP | 2011-090248 A | 5/2011 |
| JP | 2012-220805 A | 11/2012 |
| JP | 2017-535816 A | 11/2017 |
| WO | WO-2016/075195 A1 | 5/2016 |

OTHER PUBLICATIONS

International Preliminary Report on Patentability mailed Oct. 7, 2021 for PCT/JP2020/013798.

* cited by examiner

SCANNING MICROSCOPE UNIT

TECHNICAL FIELD

The present disclosure relates to a scanning microscope unit constituting a scanning microscope.

BACKGROUND ART

Conventionally, a microscope device capable of obtaining an image of a specimen to be observed has been known. For example, Patent Literature 1 below discloses a microscope connection unit including a microscope connection port which is connected to a microscope, a stimulation unit which irradiates a specimen with light, an observation unit which detects light emitted from the specimen, and an optical path synthesizer which synthesizes optical paths optically connecting the microscope to the stimulation unit and the observation unit. In the microscope connection unit with such a configuration, imaging of the specimen is realized by, for example, irradiating the specimen with excitation light and detecting fluorescence generated in response to the excitation light.

CITATION LIST

Patent Literature

Patent Literature 1: Japanese Unexamined Patent Publication No. 2011-90248

SUMMARY OF INVENTION

Technical Problem

In the above-described conventional microscope connection unit, a positional relationship between a mirror scanning excitation light in the microscope connection unit and an optical axis of a lens in the microscope may not be stabilized when the microscope connection unit is used while being connected to various types of microscopes or various makers' microscopes. Therefore, the signal intensity and resolution of the observed image tend to decrease.

Embodiments have been made in view of such problems and an object is to provide a scanning microscope unit capable of realizing imaging in which signal intensity and resolution are maintained.

Solution to Problem

An embodiment of the present disclosure is a scanning microscope unit attached to a connection port of a microscope including a microscope optical system to constitute a scanning microscope, the scanning microscope unit including: a light source configured to output irradiation light to a sample to be observed; a photodetector configured to detect observation light generated from the sample in response to the irradiation light; a scan mirror configured to scan the irradiation light output from the light source on the sample and guide the observation light generated from the sample in response to the irradiation light to the photodetector; a scan lens configured to guide the irradiation light scanned by the scan mirror to the microscope optical system and guide the observation light focused by the microscope optical system to the scan mirror; a housing to which the scan lens is fixed; an attachment portion which attaches the housing to the connection port; and a movable portion which supports the housing so that an angle of the housing with respect to the attachment portion is changeable.

According to the scanning microscope unit of the above-described embodiment, the irradiation light irradiated from the light source is scanned on the sample via the scan mirror, the scan lens, and the external microscope and the observation light generated from the sample in response to the irradiation light is detected by the photodetector via the external microscope, the scan lens, and the scan mirror. In this scanning microscope unit, the housing to which the scan lens is fixed is attached to the connection port of the microscope by the attachment portion and the angle of the housing with respect to the attachment portion is changeable. With such a configuration, the optical axis of the scan lens can be aligned to the direction of the optical axis of the optical system of the microscope according to the microscope to be attached. As a result, it is possible to realize imaging in which signal intensity and resolution are maintained.

Advantageous Effects of Invention

According to the embodiment, it is possible to realize imaging in which signal intensity and resolution are maintained.

DESCRIPTION OF EMBODIMENTS

Hereinafter, an embodiment of the present disclosure will be described in detail with reference to the accompanying drawings. Additionally, in the description, the same reference numerals will be used for the same elements or elements having the same function and redundant description will be omitted.

Figure 1:
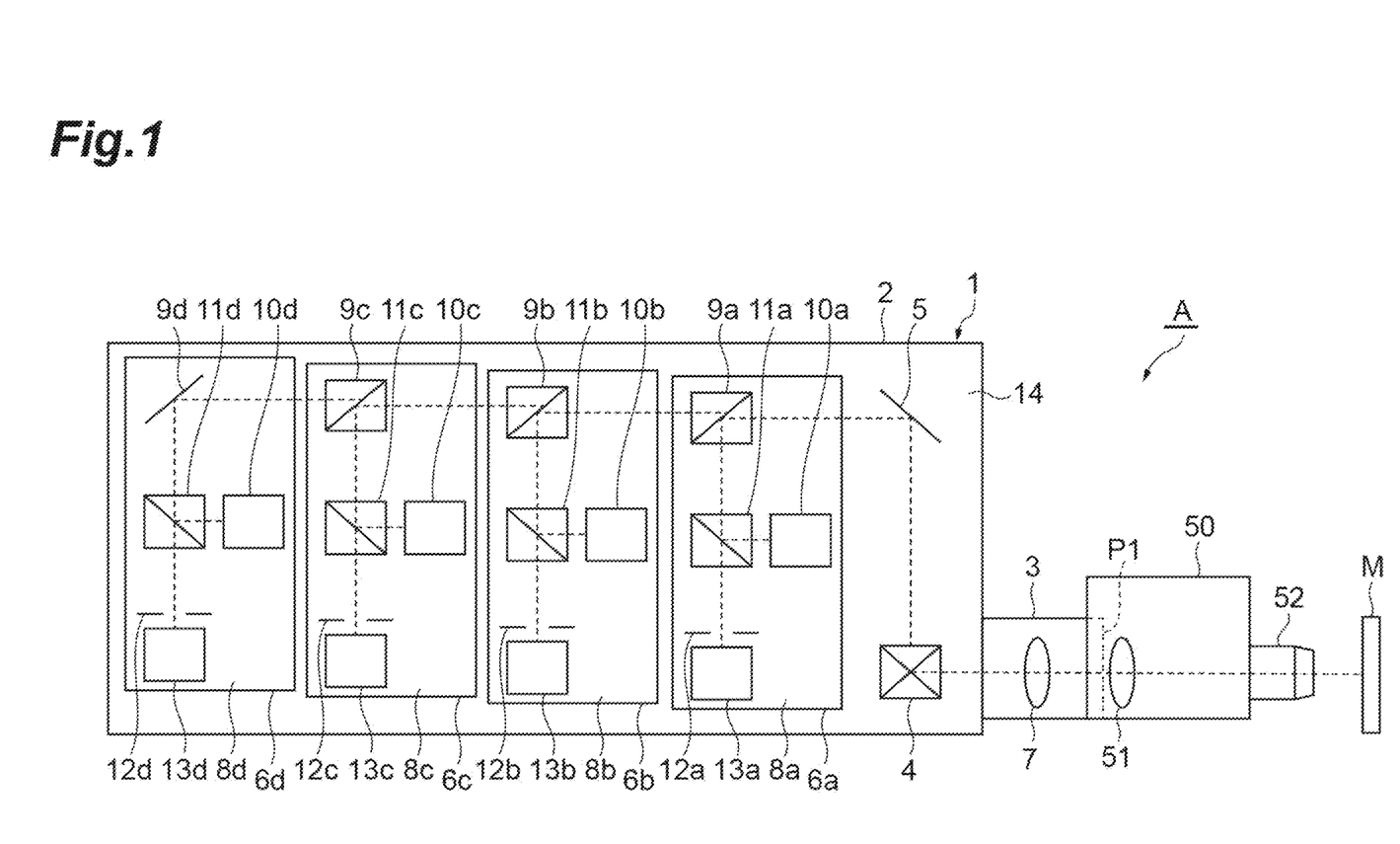
FIG. 1 is a schematic configuration diagram of a confocal microscope A according to an embodiment.

FIG. 1 is a schematic configuration diagram of a confocal microscope A which is a kind of scanning microscope according to an embodiment. The confocal microscope A shown in FIG. 1 constitutes a confocal microscope that acquires an image enabling the construction of an optical sectioning image of a sample M to be observed and is configured such that a confocal microscope unit 1 which is a scanning microscope unit according to the embodiment is connected to a connection port P1 used for connection to an external unit of a microscope 50. This confocal microscope unit 1 is a device that irradiates the sample M disposed on a stage or the like of the microscope 50 via a microscope optical system such as an imaging lens 51 and an objective lens 52 inside the microscope 50 with excitation light, receives (detects) fluorescence generated from the sample M in response to the excitation light via the microscope optical system of the microscope 50, generates an optical sectioning image, and outputs the image.

Specifically, the confocal microscope unit 1 includes a main housing 2, a lens barrel (housing) 3 which constitutes a part of the main housing 2 and is removably connected to the connection port P1 of the microscope 50, a scan mirror 4, a fixed mirror 5, and first to fourth subunits 6a to 6d which are fixed into the main housing 2, and a scan lens 7 which is fixed into the lens barrel 3. Hereinafter, each component of the confocal microscope unit 1 will be described in detail.

The scan lens 7 in the lens barrel 3 is an optical element for relaying a reflection surface of the scan mirror 4 to a pupil position of the objective lens 52 and collecting the excitation light (irradiation light) on a primary image plane of the microscope optical system of the microscope 50. The scan lens 7 irradiates the sample M by guiding the excitation light (irradiation light) scanned by the scan mirror 4 to the microscope optical system and guides the fluorescence (observation light) generated from the sample M in response to the excitation light to the scan mirror 4. Specifically, the scan lens 7 is configured to focus the pupil of the objective lens 52 on the scan mirror 4 and guides the fluorescence focused by the objective lens 52 and the imaging lens 51 of the microscope 50 to the scan mirror 4.

The scan mirror 4 in the main housing 2 is, for example, an optical scanning element such as a micro electro mechanical system (MEMS) mirror configured so that a reflector can be tilted in two axes. The scan mirror 4 has a function of scanning the excitation light (irradiation light) output from the first to fourth subunits 6a to 6d on the sample M by continuously changing a reflection angle and guiding the fluorescence (observation light) generated in response to the excitation light to the first to fourth subunits 6a to 6d.

The fixed mirror 5 is an optical reflecting element fixed into the main housing 2, reflects the excitation light output from the first to fourth subunits 6a to 6d to the scan mirror 4, and reflects the fluorescence reflected by the scan mirror 4 to the first to fourth subunits 6a to 6d coaxially with the excitation light.

The first subunit 6a includes a base plate 8a and a dichroic mirror (first beam splitter) 9a, a light source 10a, a dichroic mirror 11a, a pinhole plate (first aperture) 12a, and a photodetector (first photodetector) 13a which are disposed on the base plate 8a. The dichroic mirror 9a is a beam splitter which is fixed in the reflection direction of the fluorescence of the fixed mirror 5 and has a property of reflecting first excitation light of a wavelength $\lambda_1$ irradiated by the first subunit 6a and first fluorescence of a wavelength range $\Delta\lambda_1$ generated from the sample M in response to the first excitation light and transmitting light of a wavelength longer than those of the first excitation light and the first fluorescence. The dichroic mirror 11a is a beam splitter which is provided in the reflection direction of the first fluorescence of the dichroic mirror 9a and has a property of transmitting the first fluorescence of the wavelength range $\Delta\lambda_1$ and reflecting the first excitation light of the wavelength $\lambda_1$ shorter than the wavelength range $\Delta\lambda_1$. The light source 10a is a light emitting element (for example, laser diode) outputting the first excitation light (for example, laser beam) of the wavelength $\lambda_1$ and is disposed so that the first excitation light is reflected toward the dichroic mirror 9a coaxially with the first fluorescence by the dichroic mirror 11a. The pinhole plate 12a is an aperture which is disposed so that a pinhole position coincides with a conjugate position of a spot of the first excitation light of the sample M and limits the luminous flux of the first fluorescence and constitutes a confocal optical system along with the light source 10a and the like. This pinhole plate 12a has a pinhole diameter that can be adjusted from the outside and the resolution of the image detected by the photodetector 13a and the signal intensity of the image can be changed. The photodetector 13a is disposed so that a detection surface is opposed to the pinhole plate 12a and receives and detects the first fluorescence having passed through the pinhole plate 12a. Additionally, the photodetector 13a is a photomultiplier tube, a photodiode, an avalanche photodiode, a multi-pixel photon counter (MPPC), a hybrid photo detector (HPD), an area image sensor, or the like.

The second to fourth subunits 6b to 6d also have the same configuration as that of the first subunit 6a.

That is, the second subunit 6b includes a base plate 8b, a dichroic mirror (second beam splitter) 9b, a light source 10b, a dichroic mirror 11b, a pinhole plate (second aperture) 12b, and a photodetector (second photodetector) 13b. The dichroic mirror 9b has a property of reflecting second excitation light of a wavelength $\lambda_2$ ($>\lambda_1$) irradiated by the second subunit 6b and second fluorescence of a wavelength range $\Delta\lambda_2$ generated from the sample M in response to the second excitation light and transmitting light of a wavelength longer than those of the second excitation light and the second fluorescence. The dichroic mirror 11b has a property of transmitting the second fluorescence of the wavelength range $\Delta\lambda_2$ and reflecting the second excitation light of the wavelength $\lambda_2$ shorter than the wavelength range $\Delta\lambda_2$. The light source 10b is a light emitting element which outputs the second excitation light of the wavelength $\lambda_2$. The pinhole plate 12b is an aperture which is disposed so that a pinhole position coincides with a conjugate position of a spot of the second excitation light of the sample M and limits the luminous flux of the second fluorescence. The photodetector 13b is disposed so that a detection surface is opposed to the pinhole plate 12b and receives and detects the second fluorescence having passed through the pinhole plate 12b. Additionally, the photodetector 13b is a photomultiplier tube, a photodiode, an avalanche photodiode, a multi-pixel photon counter (MPPC), a hybrid photo detector (HPD), an area image sensor, or the like.

The third subunit 6c includes a base plate 8c, a dichroic mirror (third beam splitter) 9c, a light source 10c, a dichroic mirror 11c, a pinhole plate (third aperture) 12c, and a photodetector (third photodetector) 13c. The dichroic mirror 9c has a property of reflecting third excitation light of a wavelength $\lambda_3$ ($>\lambda_2$) irradiated by the third subunit 6c and third fluorescence of a wavelength range $\Delta\lambda_3$ generated from the sample M in response to the third excitation light and transmitting light of a wavelength longer than those of the third excitation light and the third fluorescence. The dichroic mirror 11c has a property of transmitting the third fluorescence of the wavelength range $\Delta\lambda_3$ and reflecting the third excitation light of the wavelength $\lambda_3$ shorter than the wavelength range $\Delta\lambda_3$. The light source 10c is a light emitting element which outputs the third excitation light of the wavelength $\lambda_3$. The pinhole plate 12c is an aperture which is disposed so that a pinhole position coincides with a conjugate position of a spot of the third excitation light of the sample M and limits the luminous flux of the third fluorescence. The photodetector 13c is disposed so that a detection surface is opposed to the pinhole plate 12c and receives and detects the third fluorescence having passed through the pinhole plate 12c. Additionally, the photodetector 13c is a photomultiplier tube, a photodiode, an avalanche photodiode, a multi-pixel photon counter (MPPC), a hybrid photo detector (HPD), an area image sensor, or the like.

The fourth subunit 6d includes a base plate 8d, a total reflection mirror 9d, a light source 10d, a dichroic mirror 11d, a pinhole plate (fourth aperture) 12d, and a photodetector (fourth photodetector) 13d. The total reflection mirror 9c reflects fourth excitation light of a wavelength $\lambda_4$ ($>\lambda_3$) irradiated by the fourth subunit 6d and fourth fluorescence of a wavelength range $\Delta\lambda_4$ generated from the sample M in response to the fourth excitation light. The dichroic mirror 11d has a property of transmitting the fourth fluorescence of the wavelength range $\Delta\lambda_4$ and reflecting the fourth excitation light of the wavelength $\lambda_4$ shorter than the wavelength range $\Delta\lambda_4$. The light source 10d is a light emitting element which outputs the fourth excitation light of the wavelength $\lambda_4$. The pinhole plate 12d is an aperture which is disposed so that a pinhole position coincides with a conjugate position of a spot of the fourth excitation light of the sample M and limits the luminous flux of the fourth fluorescence. The photodetector 13d is disposed so that a detection surface is opposed to the pinhole plate 12d and receives and detects the fourth fluorescence having passed through the pinhole plate 12d. Additionally, the photodetector 13d is a photomultiplier tube, a photodiode, an avalanche photodiode, a multi-pixel photon counter (MPPC), a hybrid photo detector (HPD), an area image sensor, or the like.

A positional relationship of the first to fourth subunits 6a to 6d with the above-described configuration will be described.

The first to fourth subunits 6a to 6d are fixed into the main housing 2 so that the first to fourth subunits are arranged in this order along the light guiding direction of the first to fourth fluorescences formed by the scan mirror 4 and the fixed mirror 5 to be away from the fixed mirror 5 and the dichroic mirrors 9a to 9c and the total reflection mirror 9d are located on the optical paths of the first to fourth fluorescences. Specifically, the second to fourth subunits 6b to 6d are respectively disposed to be shifted from the first to third subunits 6a to 6c by a predetermined distance d in a direction perpendicular to the light guiding direction of the second to fourth fluorescences based on the center positions of the dichroic mirrors 9a to 9c and the total reflection mirror 9d.

Figure 2:
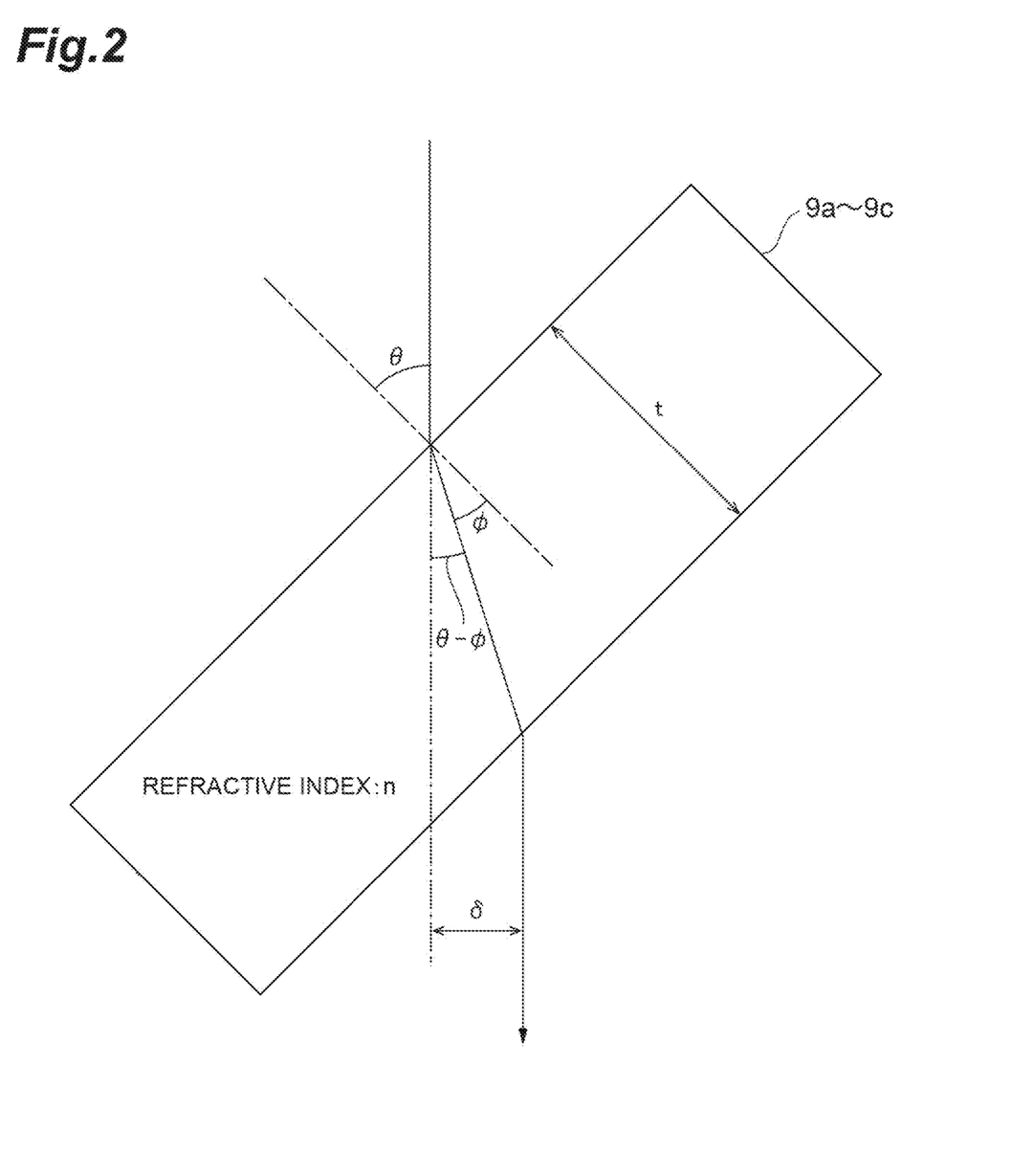
FIG. 2 is a plan view showing a refraction state of fluorescence in dichroic mirrors 9a to 9c.

This predetermined distance d is set to be substantially the same as a shift amount $\delta$ generated due to the refraction of the fluorescence of each of the dichroic mirrors 9a to 9c in a direction perpendicular to the optical path of the fluorescence transmitted in the dichroic mirrors 9a to 9c. In this embodiment, since the thickness of the mirror members constituting the dichroic mirrors 9a to 9c is set to be the same, the shift amount generated in the dichroic mirrors 9a to 9c is substantially the same and hence the shift distance d between two subunits adjacent to each other among the first to fourth subunits 6a to 6d is also set to be the same. This shift distance d is appropriately set in response to the refractive index and the thickness of the mirror member constituting the dichroic mirrors 9a to 9c. Specifically, if the mirror member has a thickness t and a refractive index n, an incident angle $\theta$ of the fluorescence incident to the mirror member, and a refracting angle $\phi$ in the mirror member, the shift amount $\delta$ of the fluorescence due to the mirror member is obtained as in FIG. 2. At this time, since the shift amount $\delta$ can be obtained as in the following formula (1), the shift distance (predetermined distance) d may be set in accordance with this shift amount $\delta$. Additionally, the incident angle $\theta$ and the refracting angle $\phi$ have a relationship of the following formula (2).

$$\delta = t \cdot \sin(\theta - \phi)/\cos \phi \quad (1)$$

$$\phi = \arcsin(\sin \theta / n) \quad (2)$$

Additionally, when the incident angle $\theta$ is set to 45°, d=$\delta$=0.33 t if the refractive index n of the mirror member is 1.5 and d=$\delta$=0.29 t when the refractive index n of the mirror member is 1.4.

Figure 3:
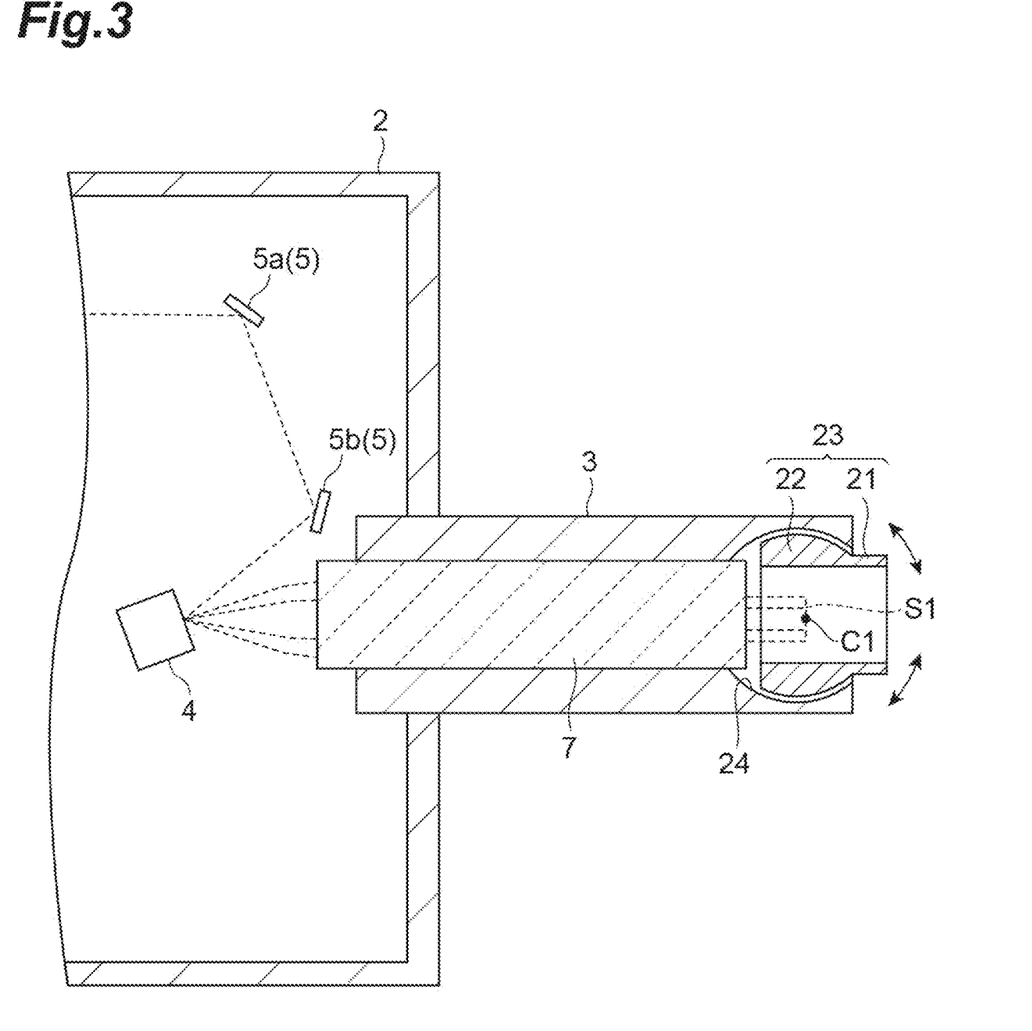
FIG. 3 is a cross-sectional view showing an attachment structure of a confocal microscope unit 1 to a microscope 50 in FIG. 1.

Next, an attachment structure of the confocal microscope unit 1 to the microscope 50 will be described in detail. FIG. 3 is a cross-sectional view showing an attachment structure of the confocal microscope unit 1 to the microscope 50.

As shown in FIG. 3, the scan lens 7 including a plurality of lenses is fixed into the lens barrel 3 and a tilt adjustment mechanism 23 in which an attachment portion 21 and a movable portion 22 are integrated with each other is provided inside the front end of the lens barrel 3. The attachment portion 21 has an annular shape which protrudes from the front end of the lens barrel 3 and the front end side thereof is provided with a structure (for example, a structure corresponding to a C mount) attachable to the connection port P1 for camera connection of the microscope 50. The movable portion 22 is formed to be continuous to the base end side of the attachment portion 21 and has a substantially annular shape and the outer surface thereof is formed as a spherical sliding surface. Further, the inner surface of the front end of the lens barrel 3 is provided with a spherical sliding surface 24 corresponding to the outer surface shape of the movable portion 22. Here, the outer surface of the movable portion 22 and the inner surface of the lens barrel 3 are formed in a shape in which a center C1 of a spherical surface including these shapes is located on the image plane S1 of the microscope optical system of the microscope 50 in a state in which the movable portion 22 is fitted into the lens barrel 3 and the attachment portion 21 is connected to the connection port P1 of the microscope 50.

According to an attachment structure in which the tilt adjustment mechanism 23 with the above-described structure is fitted into the front end side of the lens barrel 3, it is possible to support the lens barrel 3 so that an angle of the lens barrel 3 with respect to the attachment portion 21 is changeable by sliding the movable portion 22 with respect to the sliding surface 24 of the lens barrel 3 while the microscope unit is attached to the microscope 50. At this time, since the outer surface of the movable portion 22 and the inner surface of the lens barrel 3 are formed as spherical surfaces, the lens barrel 3 is rotatable with respect to the attachment portion 21 and the angle of the center axis of the lens barrel 3 with respect to the center axis of the attachment portion 21 is adjustable two-dimensionally. That is, the tilt adjustment mechanism 23 is configured to change the angle of the lens barrel 3 with respect to the attachment portion 21 so that the optical axis of the microscope optical system of the microscope 50 is parallel to the optical axis of the scan lens 7.

According to the above-described confocal microscope unit 1, the excitation light (irradiation light) irradiated from the light sources 10a to 10d of the subunits 6a to 6d is scanned on the sample M via the scan mirror 4, the scan lens 7, and the external microscope 50 and the fluorescence (observation light) generated from the sample M in response to the excitation light is detected by the photodetectors 13a to 13d of the subunits 6a to 6d via the external microscope 50, the scan lens 7, and the scan mirror 4. In this confocal microscope unit 1, the lens barrel 3 to which the scan lens 7 is fixed is attached to the connection port P1 of the microscope 50 by the attachment portion 21 and the angle of the lens barrel 3 with respect to the attachment portion 21 is changeable. With such a configuration, the optical axis of the scan lens 7 can be aligned to the direction of the optical axis of the microscope optical system of the microscope 50 according to the microscope 50 at the attachment destination. As a result, it is possible to realize imaging in which signal intensity and resolution are maintained.

Figure 4:
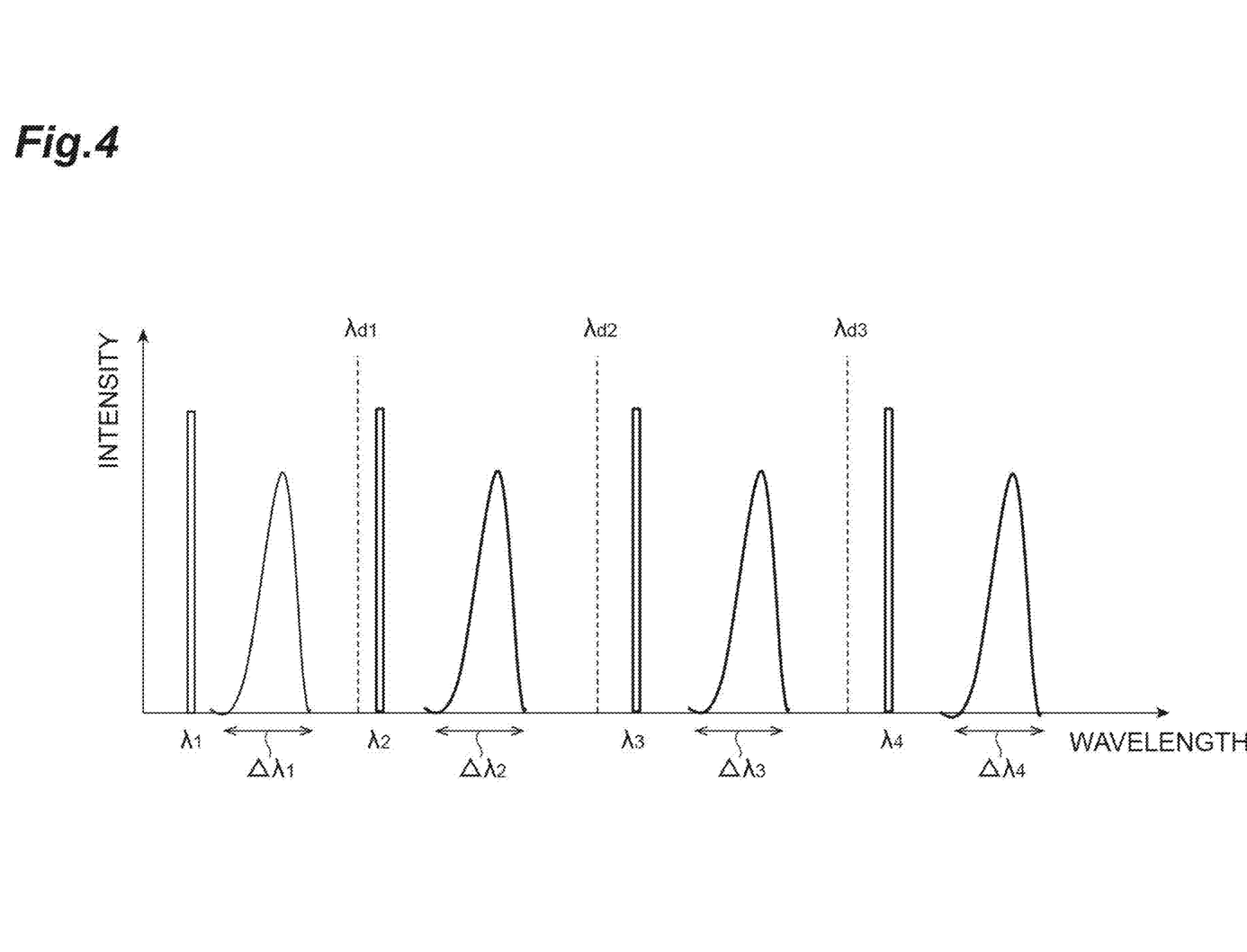
FIG. 4 is a graph showing wavelength distribution characteristics of excitation light and fluorescence handled by the first to fourth subunits 6a to 6d of FIG. 1.

FIG. 4 is a graph showing wavelength distribution characteristics of the excitation light and the fluorescence handled by the first to fourth subunits 6a to 6d. The wavelength range $\Delta\lambda_1$ of the fluorescence generated in response to the excitation light of the wavelength $\lambda_1$ irradiated from the first subunit 6a is generally in the vicinity of the wavelength $\lambda_1$ and in the range of the wavelength longer than the wavelength $\lambda_1$. On the contrary, the wavelength $\lambda_2$ of the excitation light irradiated from the second subunit 6b and the wavelength range $\Delta\lambda_2$ of the fluorescence generated in response to the excitation light are in the range of the wavelength longer than the wavelength $\lambda_1$ and the wavelength range $\Delta\lambda_1$. Here, the boundary wavelength $\lambda_{d1}$ of the optical division of the dichroic mirror 9a of the first subunit 6a is set to a value which is longer than the wavelength $\lambda_1$ and the wavelength range $\Delta\lambda_1$ and is shorter than the wavelength $\lambda_2$ and the wavelength range $\Delta\lambda_2$. Accordingly, it is possible to perform the confocal measurement in the range of the wavelength $\lambda_1$ and the wavelength range $\Delta\lambda_1$ using the first subunit 6a and to perform the confocal measurement in the range of the wavelength $\lambda_2$ and the wavelength range $\Delta\lambda_2$ using the second subunit 6b of the same device. Similarly, the boundary wavelength $\lambda_{d2}$ of the optical division of the dichroic mirror 9b of the second subunit 6b is set to a value which is longer than the wavelength $\lambda_2$ and the wavelength range $\Delta\lambda_2$ and is shorter than the wavelength $\lambda_3$ and the wavelength range $\Delta\lambda_3$ and the boundary wavelength $\lambda_{d3}$ of the optical division of the dichroic mirror 9c of the third subunit 6c is set to a value which is longer than the wavelength $\lambda_3$ and the wavelength range $\Delta\lambda_3$ and is shorter than the wavelength $\lambda_4$ and the wavelength range $\Delta\lambda_4$. Accordingly, it is possible to perform the confocal measurement in the range of the wavelength $\lambda_3$ and the wavelength range $\Delta\lambda_3$ using the third subunit 6c of the same device and to perform the confocal measurement in the range of the wavelength $\lambda_4$ and the wavelength range $\Delta\lambda_4$ using the fourth subunit 6d of the same device.

Here, the movable portion 22 of the tilt adjustment mechanism 23 is configured to change the angle of the lens barrel 3 so that the optical axis of the scan lens 7 is parallel to the optical axis of the microscope optical system of the microscope 50. In this case, since the direction of the optical axis of the scan lens 7 is aligned to the optical axis of the microscope optical system, the scan mirror 4 and the pupil positions of the objective lens 52 can be arranged at the conjugate position, the NA of the objective lens 52 can be used to the maximum, and the signal intensity and resolution of the signal detected by the photodetectors 13a to 13d can be reliably improved.

In particular, the movable portion 22 is rotatable with respect to the attachment portion 21. With such a configuration, the direction of the scan lens 7 and the optical axis of the microscope optical system can be aligned two-dimensionally and the signal intensity and resolution of the signal detected by the photodetectors 13a to 13d can be reliably improved. Further, the rotation center C1 of the movable portion 22 is formed to be included in the image plane S1 of the microscope optical system. In this way, since the adjustment can be performed without affecting the field of view, it is not necessary to alternately repeat the field of view adjustment and the angle adjustment.

Figure 5:
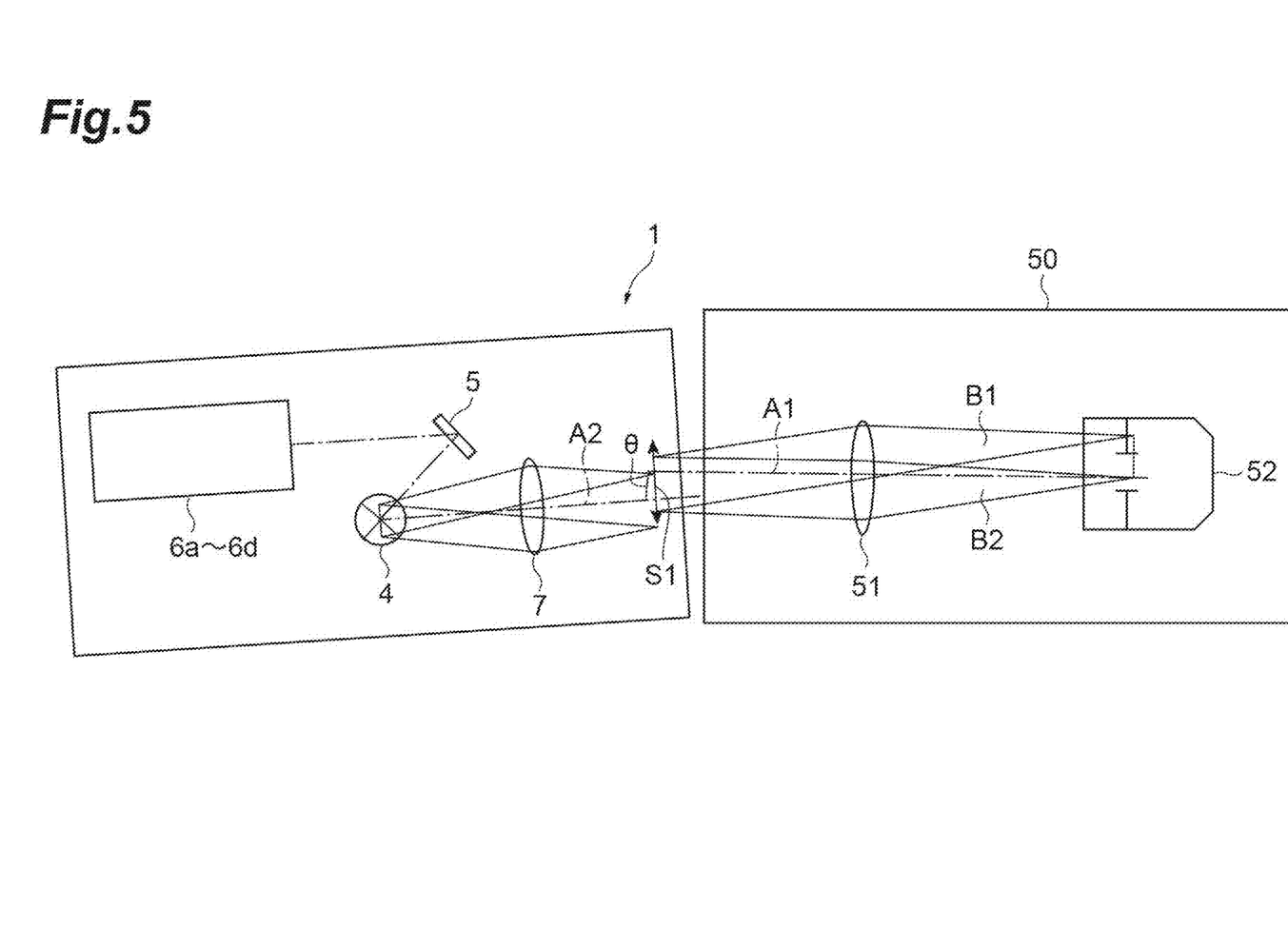
FIG. 5 is a diagram showing an image of a light guide of excitation light or fluorescence in the confocal microscope unit 1.
Figure 6:
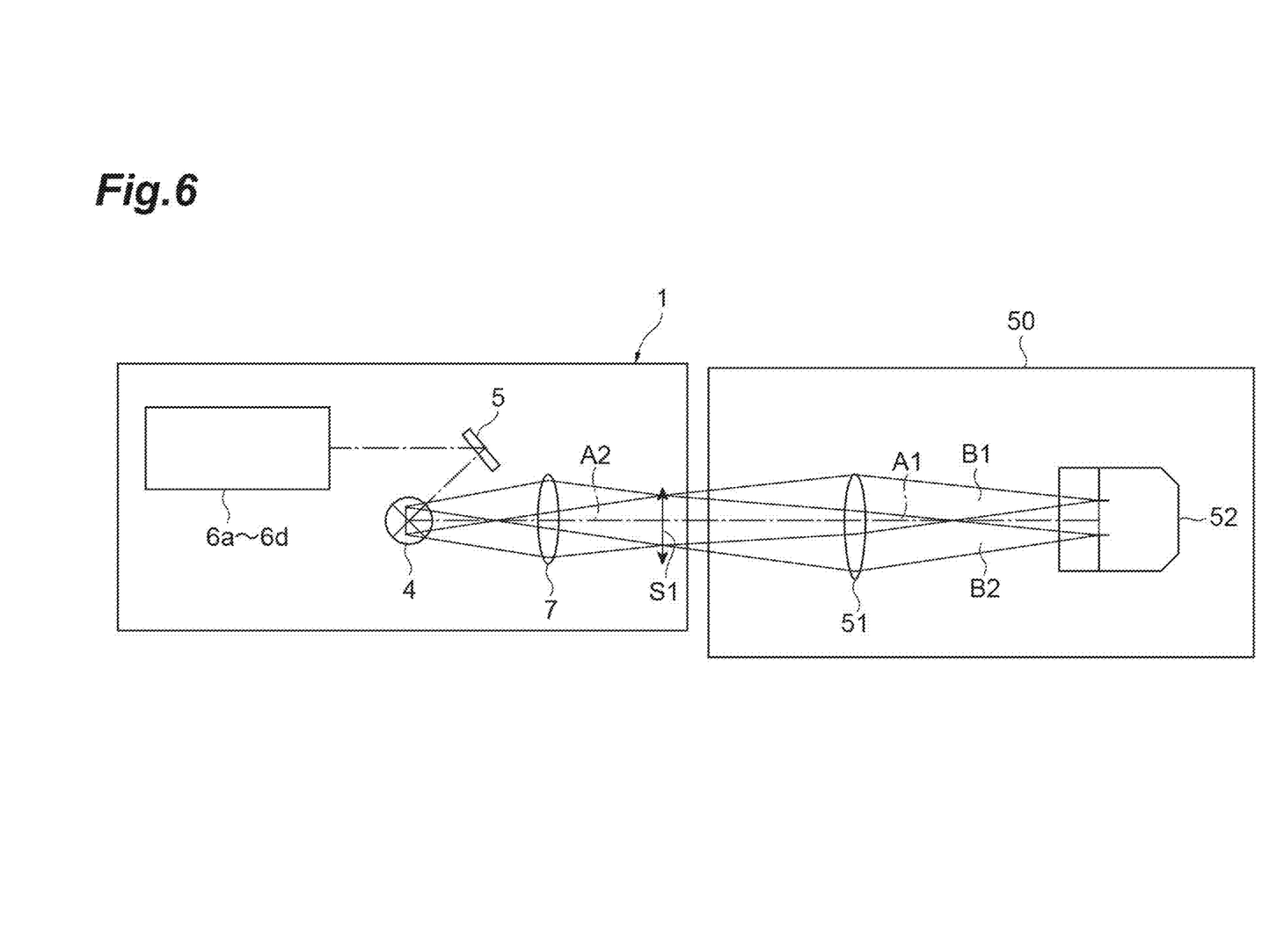
FIG. 6 is a diagram showing an image of a light guide of excitation light or fluorescence in the confocal microscope unit 1.

FIG. 5 shows an image of a light guide of the excitation light or fluorescence when the direction of the optical axis of the scan lens 7 in the confocal microscope unit 1 does not coincide with the direction of the optical axis of the microscope optical system and FIG. 6 shows an image of a light guide of the excitation light or fluorescence when the direction of the optical axis of the scan lens 7 in the confocal microscope unit 1 coincides with the direction of the optical axis of the microscope optical system.

In the confocal microscope unit 1, the microscope optical system and the scan lens 7 are adjusted in advance so that the objective lens pupil of the microscope 50 is focused on the scan mirror 4. Accordingly, since the changing of the angle by driving the scan mirror 4 is equivalent to the swinging the angle of the beam of the excitation light or fluorescence at the pupil of the objective lens 52, it is possible to reduce the loss of the beam and to sufficiently exhibit the performance of the objective lens 52. Here, the size of the objective lens pupil differs depending on the objective lens 52 and the beam diameter of the excitation light or fluorescence needs to be equal to or larger than the pupil size. However, since the scan mirror 4 configured as the MEMS mirror or the like generally has a small diameter and a large swing angle, the objective lens pupil may not be included in the scan mirror 4 when using the objective lens 52 with a large pupil having a low magnification and a low NA.

Further, in the microscope 50, the optical axis of the microscope may be inclined with respect to the connection port P1 (FIG. 1) due to the assembling error. This inclination becomes a problem when photographing and detecting the observation light and particularly becomes a problem in the application to the scanning microscope. As a result, as shown in FIG. 4, an optical axis A2 of the scan lens 7 may be inclined with respect to an optical axis A1 of the microscope optical system by an angle θ (>0) when the confocal microscope unit 1 is attached to the microscope 50. In such a case, when the scan mirror 4 is driven to change the focus position of the excitation light and irradiates the sample M as the beams B1 and B2, the positions of the beams B1 and B2 may be displaced from the aperture of the objective lens and a part of the excitation light may be cut off. As a result, the amount of signal and resolution in the image generated by using the subunits 6a to 6d decrease.

In contrast, as shown in FIG. 6, the positions of the beams B1 and B2 can be aligned to the aperture position of the objective lens when the focus position of the excitation light is changed and the sample M is irradiated with the beams B1 and B2 by adjusting the direction of the optical axis A2 of the scan lens 7 to be aligned to the optical axis A1 of the microscope optical system by the tilt adjustment mechanism 23 when the confocal microscope unit 1 is attached to the microscope 50. As a result, it is possible to prevent the excitation light from being cut off and to increase the amount of signal and resolution in the image generated by using the subunits 6a to 6d.

Figure 7:
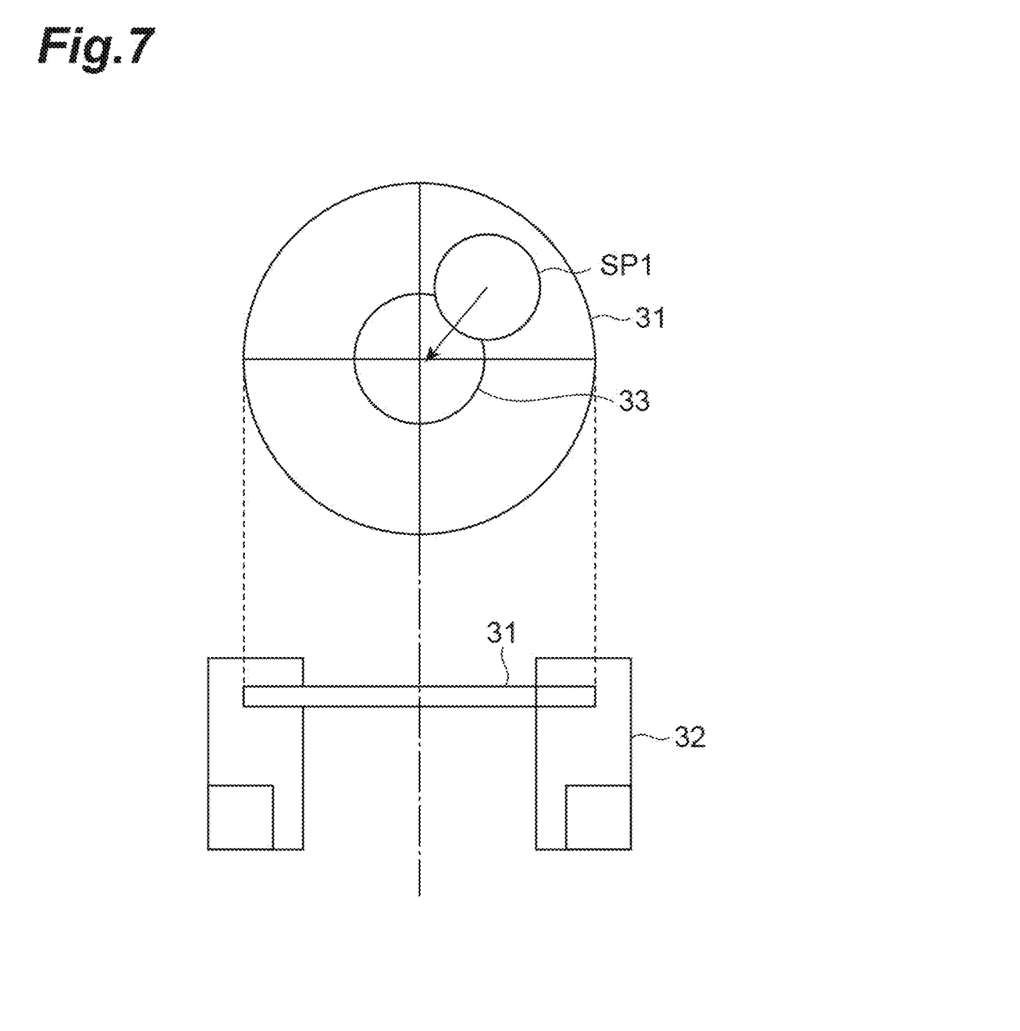
FIG. 7 is a diagram showing a configuration of a jig used for adjusting the tilt of the confocal microscope unit 1.

The tilt adjustment using the tilt adjustment mechanism 23 of the embodiment can be realized by using a jig shown in FIG. 7. FIG. 7 is a diagram showing a configuration of a jig used for adjusting the tilt of the confocal microscope unit 1. As the jig, a jig including a disk-shaped target member 31 and a mount portion 32 for attaching the target member 31 to the microscope 50 instead of the objective lens 52 can be adopted. A circular marking 33 is provided at the center of the surface of the target member 31 and the jig is configured so that the position of the marking 33 may coincide with the pupil position of the objective lens 52 when it is attached to the microscope 50 by the mount portion 32.

By using such a configuration, a spot SP1 of the excitation light irradiated to the target member 31 while the excitation light is output using the confocal microscope unit 1 is observed using an external camera or the like. Then, it is possible to adjust the direction of the optical axis of the scan lens 7 to the optical axis of the microscope optical system by adjusting the tilt so that the spot SP1 of the excitation light coincides with the marking 33 on the target member 31.

Further, the scan mirror 4 may be a MEMS mirror. In this case, it is possible to easily realize the miniaturization of the device.

Further, the subunits 6a to 6d are respectively provided with the pinhole plates 12a to 12d which limit the luminous flux of the observation light returned via the scan mirror 4 and the photodetectors 13a to 13d are configured to detect the observation light having passed through the pinhole plates 12a to 12d. In this case, it is possible to realize imaging in which signal intensity and resolution are maintained in the confocal observation.

Although various embodiments of the present disclosure have been described above, the present disclosure is not limited to the above-described embodiment and may be modified without departing from the spirit of each claim or may be applied to other embodiments.

The tilt adjustment mechanism 23 of the above-described embodiment is not limited to the configuration of the movable portion 22 having a spherical sliding surface and the movable portion 22 may be configured by using a rubber member or a bellows-shaped member.

Further, in the above-described embodiment, the excitation light is irradiated by each of the subunits 6a to 6d and the fluorescence generated in response to the excitation light is detected. However, the reflection light generated from the sample M in response to the irradiation of the irradiation light may be detected.

Further, the above-described embodiment is not limited to a case used as the confocal microscope and may be used as a general fluorescence microscope, reflection microscope, or the like if it is a scanning microscope using a scan mirror.

Further, the above-described embodiment is not limited to the application of the scanning microscope using the scan mirror and is also effective when inclining the housing of the optical unit so that the optical axis of the microscope optical system of the microscope 50 is parallel to the optical axis of the lens of the optical unit when the optical unit with the lens is attached to the connection port P1 of the optical microscope. In this case, it is easy to adjust the optical axis between the optical microscope and the optical unit.

In the above-described embodiment, the pinhole plate is used as an aperture to form a confocal optical system, but may be, for example, an iris diaphragm, a fiber core, or the like if the aperture is any optical element that limits the luminous flux. When a fiber output type light source is used, the position of the end surface of the fiber core may be the aperture position (the position where the luminous flux is limited).

Further, in the above-described embodiment, a laser light source such as a solid-state laser or a diode laser can also be used. In this case, the position of the beam waist of these laser light sources may be set to the aperture position (the position where the luminous flux is limited) and the light source itself plays the role of the aperture.

In the above-described embodiment, the movable portion may change the angle of the housing so that the optical axis of the scan lens is parallel to the optical axis of the microscope optical system. In this case, it is possible to reliably improve the signal intensity and resolution of the signal detected by the photodetector by aligning the direction of the scan lens to the optical axis of the microscope optical system.

Further, the movable portion may be rotatable with respect to the attachment portion. By adopting such a configuration, it is possible to two-dimensionally align the direction of the scan lens to the optical axis of the microscope optical system and to reliably improve the signal intensity and resolution of the signal detected by the photodetector.

Further, the rotation center of the movable portion may be included in the image plane of the microscope optical system. In this way, it is possible to obtain an effect of increasing the signal amount detected by the photodetector and improving the resolution of the signal without affecting the field of view.

Further, the scan mirror may be a MEMS mirror. In this case, the miniaturization of the device can be easily realized.

Further, the photodetector may detect the fluorescence generated in response to the irradiation of the irradiation light as the observation light and detect the reflection light generated in response to the irradiation of the irradiation light as the observation light. According to such a configuration, it is possible to realize imaging in which signal intensity and resolution are maintained in the imaging of various kinds of observation light.

Further, the aperture configured to limit the luminous flux of the observation light returned via the scan mirror may be further provided and the photodetector may detect the observation light having passed through the aperture. In this case, it is possible to acquire an optical sectioning image by a confocal observation. Further, this aperture may be the pinhole plate.

INDUSTRIAL APPLICABILITY

In the embodiment, it is possible to realize imaging in which signal intensity and resolution are maintained in the scanning microscope unit constituting the scanning microscope.

REFERENCE SIGNS LIST

A1, A2: optical axis, C1: rotation center, M: sample, P1: connection port, S1: image plane, d: predetermined distance, 10a to 10d: light sources, 12a to 12d: pinhole plates (apertures), 13a to 13d: photodetectors, 6a to 6b: first to fourth subunits, 9a to 9c: dichroic mirrors, 1: confocal microscope unit, 2: main housing, 3: lens barrel (housing), 4: scan mirror, 7: scan lens, 21: attachment portion, 22: movable portion, 23: tilt adjustment mechanism, 24: sliding surface, 50: microscope, 52: objective lens.

The invention claimed is:

1. A scanning microscope unit attached to a connection port of a microscope including a microscope optical system to constitute a scanning microscope, the scanning microscope unit comprising:
   a light source configured to output irradiation light to a sample to be observed;
   a photodetector configured to detect observation light generated from the sample in response to the irradiation light;

a scan mirror configured to scan the irradiation light output from the light source on the sample and guide the observation light generated from the sample in response to the irradiation light to the photodetector;

a main housing in which the scan mirror is internally disposed;

a scan lens configured to guide the irradiation light scanned by the scan mirror to the microscope optical system and to guide the observation light focused by the microscope optical system to the scan mirror;

a scan lens housing to which the scan lens is fixed;

an attachment portion which attaches the scan lens housing to the connection port; and a movable portion which supports the scan lens housing so that an angle of the scan lens housing with respect to the attachment portion is changeable, wherein the scan lens housing is fixed to the main housing, the movable portion is fitted into the scan lens housing, and an outer surface of the movable portion is formed as a spherical sliding surface, and an inner surface of the scan lens housing is provided with a spherical sliding surface corresponding to the outer surface of the movable portion.

2. The scanning microscope unit according to wherein the movable portion is capable of changing the angle of the scan lens housing so that an optical axis of the scan lens is parallel to an optical axis of the microscope optical system.

3. The scanning microscope unit according to claim 1, wherein the movable portion is rotatable with respect to the attachment portion.

4. The scanning microscope unit according to claim 3, wherein a rotation center of the movable portion is included in an image plane of the microscope optical system.

5. The scanning microscope unit according to claim 1, wherein the scan mirror is a MEMS mirror.

6. The scanning microscope unit according to claim 1, wherein the photodetector detects fluorescence generated in accordance with the irradiation of the irradiation light as the observation light.

7. The scanning microscope unit according to claim 1, wherein the photodetector detects reflection light generated in accordance with the irradiation of the irradiation light as the observation light.

8. The scanning microscope unit according to claim 1, further comprising:

an aperture configured to limit a luminous flux of the observation light returned via the scan mirror, wherein the photodetector detects the observation light having passed through the aperture.

9. The scanning microscope unit according to claim 8, wherein the aperture is a pinhole plate.

* * * * *